United States Patent [19]
Roberts

[11] Patent Number: 4,706,151

[45] Date of Patent: Nov. 10, 1987

[54] POWER LIMITER FOR ELECTRICAL CONTACTS

[75] Inventor: William J. Roberts, Toledo, Ohio

[73] Assignee: Allied Corporation, N.J.

[21] Appl. No.: 722,239

[22] Filed: Apr. 11, 1985

[51] Int. Cl.[4] ................................................ H02H 3/24

[52] U.S. Cl. ............................................ 361/6; 361/2

[58] Field of Search ........................ 361/2, 6, 105, 163; 307/140; 123/145 A

[56] References Cited

U.S. PATENT DOCUMENTS

| | | | |
|---|---|---|---|
| 3,430,063 | 2/1969 | Webb | 361/6 X |
| 3,641,407 | 2/1972 | Scott | 361/6 X |
| 4,250,531 | 2/1981 | Ahrens | 361/2 |
| 4,389,691 | 6/1983 | Hancock | 361/6 X |
| 4,636,907 | 1/1987 | Howell | 361/11 X |

*Primary Examiner*—A. D. Pellinen
*Assistant Examiner*—Derek S. Jennings
*Attorney, Agent, or Firm*—Allegretti, Newitt, Witcoff & McAndrews, Ltd.

[57] ABSTRACT

A bias control circuit controlling the power transistor Q2 in a transistor amplifier circuit for supressing the arc formed across the contacts 12, 14, 16 in a glow plug controller 10 for diesel engines. The bias circuit generates a load line for the contacts 12, 14, 16 which has a high voltage, low current portion and a high current, low voltage portion. The arc is formed when the contact 14, which may be slow operating, is required to break a high current, high voltage line.

6 Claims, 3 Drawing Figures

POWER LIMITER FOR ELECTRICAL CONTACTS

This invention relates to bias circuits in general and more particularly to bias control circuits for transistorized control circuits having both a high current, low voltage and a high voltage, low current load lines across contact means.

BACKGROUND OF THE INVENTION

In diesel engine motor vehicles, a glow plug is often used to ignite the fuel on those occasions when the fuel temperature is not high enough to allow combustion. Glow plugs designed for fast response may be protected from overheating by the use of electrothermally actuated switches or bimetal contacts which are opened and closed in response to a flow of current heating the switch. Such a system automatically compensates for the effects of voltage and ambient temperature on the glow plug's temperature.

A typical glow plug controller may have three heater operated bimetal contacts used in series to control a relay coil having heavy duty contactors. The contactors are connected in series between the glow plugs and the source of electrical power.

The bimetal contacts controlling the relay coil, are required to make and break electrical current paths. As such, considerable electrical arcing may occur across the contacts resulting in contact failure. In a typical controller, there are three such bimetal contacts in series. The first contact is a circuit breaker contact and generally does not operate except in response to malfunction. The second contact is a thermal oscillator and operates to modulate the temperature of the glow plugs. The thermal oscillator contacts energize and deenergize a relay coil and as such make and break a relatively heavy current load. The third contact, the afterglow contact, controls the time that the glow plug controller operates. It is normally closed and is opened from electrical current supplied to its heater from the alternator after the engine is started and running. Because the contact timings are asynchronous, the afterglow contacts may break the relay coil current.

The opening of the bimetal contacts when current is being supplied to the relay results in an arc across the contacts and eventual destruction of the contacts. When the contacts are destroyed, the vehicle may not start and there are times when such non-starting may result in a dangerous situation.

SUMMARY OF INVENTION

It is a principle advantage of the invention to provide an arc supression circuit to protect the bimetal contacts.

These and other advantages are found in the bias control circuit for a transistor amplifier circuit of the present invention. The transistor amplifier circuit has at least one contact means and a load means electrically connected in series. The bias control circuit has a first bias circuit operable for generating a first load line for the contact means in the transistor amplifier circuit. The first bias circuit provides a base voltage level to the transistor means to allow a high current, low voltage condition across the contact means. A second bias circuit operates to generating a second load line for the contact means. The second bias circuit is electrically connected in parallel with the first bias circuit, and provides a base voltage level to the transistor means for allowing a high voltage, low current condition across the contact means.

DESCRIPTION OF THE DRAWINGS

These and other advantages will become apparent from the following drawings and detailed description in which.

DETAILED DESCRIPTION

Figure 1:
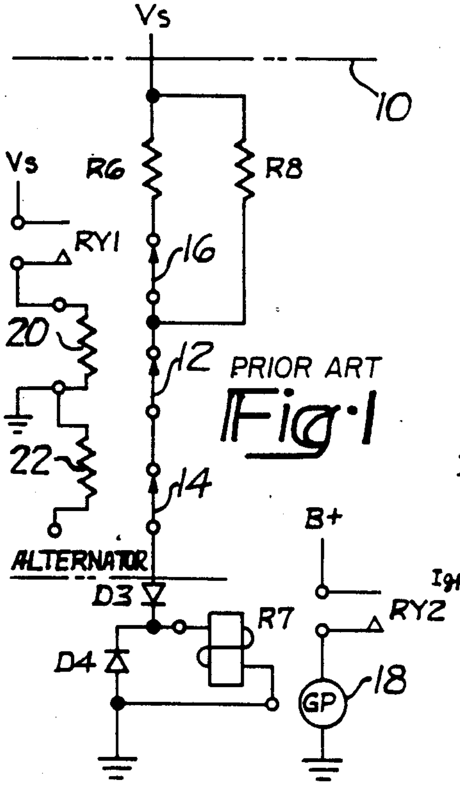
PRIOR ART Fig·1
FIG. 1 is a schematic of the portion of the glow plug controller in which the arc occurred.

FIG. 1 illustrates in schematic form, the prior art glow plug controller 10 with the series circuit of the bimetal contacts 12, 14, 16 controlling a relay coil R7. It is to be appreciated that the complete glow plug controller 10 is more extensive than that shown.

The series circuit comprises a heating resistor R6 connected to a circuit breaker contact 16. Electrically connected in parallel with the heating resistor R6 and the circuit breaker contact 16 is another resistive element R8 which provides sufficient heat to keep the circuit breaker contact 16 latched open once it is tripped.

The next two contacts 12, 14 illustrated in FIG. 1 are the main bimetal contacts in the glow plug controller 10. One of the contacts 12 functions as a thermal oscillator and operates to control the upper temperature limit of the glow plugs 18 by modulating the power to the relay coil R7 causing the relay contacts RY1, RY2 to open and close. Opening and closing the relay contacts RY1 controls the flow of current to the heater 20 for the thermal oscillator contact 12. Opening and closing the relay contacts RY2 controls the flow of current to the glow plug 18. The other of the contacts 14, called the afterglow contact, remains closed until its heater 22 generates sufficient heat to open the contact. The heater 22 is supplied by current from the vehicle alternator (not shown) and after a predetermined period of time the heater 22 will generate a sufficient amount of heat to open the contact 14 and will keep the contact open as long as the alternator is running.

The series circuit is completed by a series diode D3, to prevent electrical damage due to a reverse polarity voltage connection. A rectifier D4 is electrically connected in parallel with the coil R7 of the relay to control inverse voltage spikes when the coil is deenergized.

In the operation of FIG. 1, the power is supplied from the battery to the series circuit. The battery power is controlled by some means such as an ignition switch being turned to the start position. All contacts 12, 14, 16 are normally closed and the relay coil R7 is energized closing the relay contacts RY1, RY2 for heating the heater 20 and the glow plug 18. The thermal oscillator contacts 12, being electrothermally operated contacts or bimetal switches, begin to heat and slowly open. Once opened the relay contacts RY1, RY2 open and the heater and the glow plug cools.

Opening the thermal oscillator contacts 12 interrupts the flow of current to the heater R6 of the circuit breaker contacts 16. Once the heater 20 for the thermal oscillator contact 12 cools, the circuit is reclosed and the relay coil R7 reenergized.

It has been observed that the slow opening of the bimetal contacts 12, 14 causes an arc to be formed across the contacts. This arc causes the contacts to eventually fail and the control of the glow plugs 18 is adversely affected. It is the elimination of this arc that is the goal of the bias control circuit or arc suppression circuit of the present invention.

Figure 2:
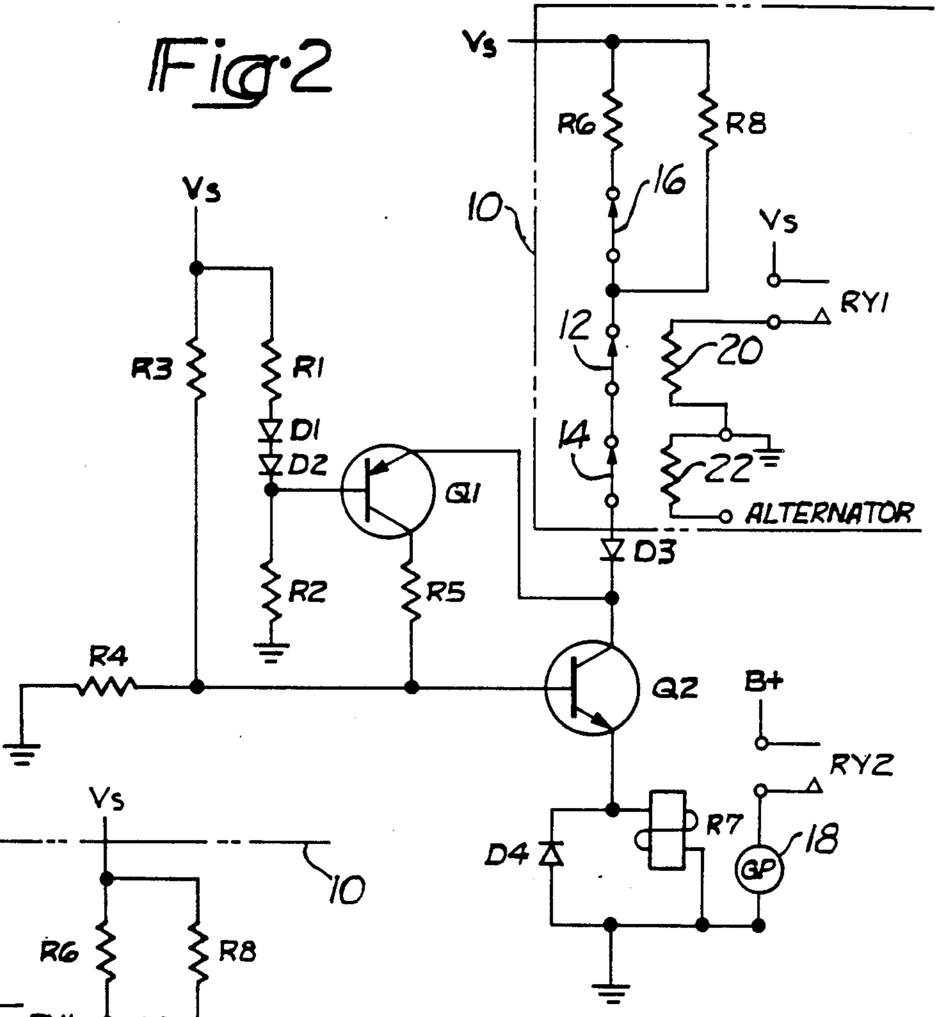
FIG. 2 is a schematic of the bias circuit of the present invention.

Referring to FIG. 2, the arc suppression circuit of the present invention is illustrated. The series circuit having the circuit breaker contact 16 and its heater resistor R6 connected in series with the two bimetal contacts 12, 14 forming the thermal oscillator and the afterglow control, the diode D3 and relay coil R7 now includes a power amplifier or transistor means Q2. The transistor means Q2 is a Darlington transistor that is controlled by a bias circuit comprising a first circuit for low voltage high current through the contacts 12, 14, 16 and a second circuit for high voltage, low current through the contacts. In addition, the second circuit functions to permit the use of low voltage relay control inasmuch as the Darlington transistor Q2 will absorb the power drop.

Electrically connected between the collector lead of the Darlington transistor Q2 and the bimetal contact 14 is an optional rectifier D3 positioned to protect the circuit if the polarities of the voltage supply $V_s$ are reversed.

The first circuit has voltage divider circuit comprising resistors R1 and R2 and diode means, shown as two diodes D1, D2, connected across the power supply. At the junction of the diodes D1, D2 and the resistor R2, the base lead of a control transistor Q1 is connected. The function of the diodes D1, D2 is to set the high current condition above the low current condition and by compensating for the diode drops in the circuit. The emitter lead of the control transistor Q1 is connected to the collector lead of the Darlington transistor Q2 and the collector lead of the control transistor Q1 is connected through a resistor R5 to the base lead of the Darlington transistor Q2. The resistor R5 is also connected to the return of the power supply or ground through a resistor R4.

The second circuit comprises a voltage divider circuit comprising two resistors R3 and R4 connected across the power supply. At the junction of the two resistors R3 and R4, the base lead of the Darlington transistor Q2 is connected. The voltage divider circuit functions to develop a low voltage for the base lead of the Darlington transistor Q2. In the preferred embodiment as illustrated, the power supply is a nominal twenty-four volt supply and the two resistors R3 and R4 are 3300 ohms and 680 ohms respectively, generating a voltage level of four volts to the base of the Darlington transistor Q2. When the second circuit controls the base voltage to the Darlington transistor Q2, the voltage drop across the bimetal contacts 12, 14, 16 is high, but the current is low due to the electrical position of the relay coil R7 in the emitter circuit of the Darlington transistor Q2.

In the preferred embodiment, in the first circuit, the voltage divider circuit resistors R1 and R2 are 470 ohms and 5600 ohms respectively, generating a voltage level of twenty-two volts at the base of the control transistor Q1. This voltage level coupled with the voltage on its collector being nearly equal to the supply voltage, will hold the collector of the Darlington transistor Q2 to a voltage equal to the base voltage plus the voltage across the emitter to base junction. When the first circuit controls the base voltage to the Darlington transistor Q2, the voltage drop across the bimetal contacts 12, 14, 16 is negligible but the current flowing through the contacts is high and is set by the voltage drop across the resistor R6. This current flows into the transistor Q2 to determine the voltage across the relay coil R7. In the nominal case, this voltage is eleven volts leaving the voltage drop across the Darlington transistor Q2 of approximately eleven volts.

Upon ignition turn on, power is supplied to the series circuit and to the bias circuit. The control transistor Q1 biases the Darlington transistor Q2 to have a collector current sufficient to energize the relay coil R7. As current flow through the series circuit, the relay coil energizes causing its contacts RY1, RY2 to close for heating the contact heater 20 and the glow plugs 18. The current through the thermal oscillator heater 20 begins to heat the bimetal. Once the bimetal is heated, the thermal oscillator contacts 12 open, removing power from the relay R7 and the series circuit. Removing the power from the relay coil R7 will open the various relay contacts RY1, RY2 to remove power from the glow plug 18 and from the heater 20 for the thermal oscillator contacts 12. This heating and cooling will continue until the afterglow contacts 14 open. This will happen a period of time after the alternator on the engine is operated. As previously stated, current generated by the alternator is supplied to the afterglow contact heater 22.

The second circuit operates to maintain a current flow through the series circuit when the circuit breaker 16 has opened and the flow of current is limited by the Darlington transistor Q2. The base voltage on the Darlington transistor Q2 is only a few volts, hence the collector current is very low.

Figure 3:
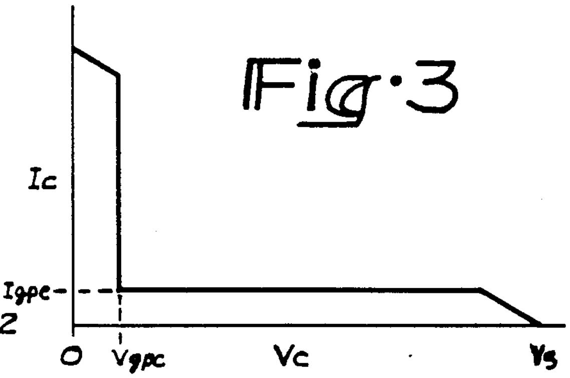
FIG. 3 is a graph of the load line of the contact means in the amplifier.

FIG. 3 illustrates the load line of the contacts 12, 14, 16. The first part of the load line represents the voltage $V_{gpc}$, across the glow plug controller 10. The second part of the load line represents the current, $I_{gpc}$, through the glow plug controller 10. The equation for the voltage $V_{gpc}$ is:

$$_{gpc}=[(R1\ Vs)/(R1+R2)]-2V_d$$

where $V_d$ is the diode drop across the base-emitter circuit.

The equation for the current $I_{gpc}$ is:

$$I_{gpc}=[[(R4\ Vs)/(R4+R3)]-2V_d]/R7.$$

In summary there has been shown and described an arc suppression circuit as may be used to control the flow of current through a series circuit containing one or more bimetal contacts. The arc suppression circuit or bias circuit, establishes a low power condition across the bimetal contacts in order to reduce or prevent the formation of an electrical arc which operates to destroy the contacts. When the current is high, the voltage drop across the bimetal contacts is low and when the current through the bimetal contacts is low, the voltage drop across the contacts is high, but in both cases the amount of power is small, hence the arc is either non-destructive or non-existent.

What is claimed is:

1. An electric contact circuit comprising, in combination:

a voltage source;

a pair of electrical contacts exhibiting a voltage;

an electrical load in series with said voltage source and electrical contacts;

current controller means, in series with said electrical contacts, for limiting current through said electrical contacts, said current controller means having a current controlling input for receiving first and second input signals thereon, said current controller means limiting current through said electrical contacts in response to said second input signal;

a first bias circuit, interconnected to said electrical contacts and said current controlling input, for sensing said voltage across said electrical contacts and providing said first input signal to said current controlling input of said current controller means in response to sensing a low voltage across said electrical contacts, whereby current may flow substantially unimpeded through said electrical contacts; and a second bias circuit, interconnected to said current controlling input, for providing said second input signal to said current controlling input in an absence of said first input signal, whereby current through said electrical contacts is substantially reduced.

2. An electric contact circuit as claimed in claim 1 wherein said current controller means comprises a primary transistor having a predetermined configuration and said first bias circuit comprises a first transistor having a common base.

3. An electric contact circuit as claimed in claim 2 wherein said primary transistor comprises an NPN transistor and said first transistor comprises a PNP transistor.

4. An electric contact circuit as claimed in claim 3 wherein said second bias circuit comprises a resistive voltage divider circuit.

5. An electric contact circuit claimed in claim 4 wherein said primary transistor includes a base and said current controlling input comprises said base of said primary transistor.

6. An electric contact circuit as claimed in claim 4 wherein said primary transistor includes a collector and said base, said first transistor includes a base and emitter, and said collector of said primary transistor is electrically interconnected to said emitter of said first transistor.

* * * * *